(12) United States Patent
Schneider et al.

(10) Patent No.: US 9,112,219 B2
(45) Date of Patent: Aug. 18, 2015

(54) MULTIPLE STACK FUEL CELL SYSTEM WITH SHARED PLENUM

(75) Inventors: Jonathan Schneider, Honeoye Falls, NY (US); Karl J. Haltiner, Jr., Fairport, NY (US); Charles J. Badura, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 957 days.

(21) Appl. No.: 12/840,578

(22) Filed: Jul. 21, 2010

(65) Prior Publication Data

US 2011/0269042 A1    Nov. 3, 2011

(51) Int. Cl.
*H01M 8/04*  (2006.01)
*H01M 8/24*  (2006.01)
*H01M 8/12*  (2006.01)

(52) U.S. Cl.
CPC ............ *H01M 8/249* (2013.01); *H01M 8/2415* (2013.01); *H01M 8/2485* (2013.01); *H01M 2008/1293* (2013.01); *Y02E 60/50* (2013.01); *Y02E 60/525* (2013.01)

(58) Field of Classification Search
None
See application file for complete search history.

(56) References Cited

U.S. PATENT DOCUMENTS

| | | |
|---|---|---|
| 5,298,341 A | 3/1994 | Khandkar et al. |
| 5,480,738 A | 1/1996 | Elangovan et al. |
| 6,110,612 A | 8/2000 | Walsh |
| 6,692,859 B2 | 2/2004 | Mukerjee et al. |
| 7,279,246 B2 | 10/2007 | Kelly et al. |
| 7,306,872 B2 | 12/2007 | Haltiner, Jr. et al. |
| 2003/0235746 A1* | 12/2003 | Haltiner et al. ................. 429/38 |
| 2009/0053569 A1 | 2/2009 | Perry et al. |

* cited by examiner

*Primary Examiner* — Patrick Ryan
*Assistant Examiner* — Wyatt McConnell
(74) *Attorney, Agent, or Firm* — Thomas N. Twomey

(57) ABSTRACT

A multi-stack fuel cell system is disclosed where multiple fuel cell stacks can be efficiently connected together. The fuel cell system includes a plurality of fuel cell modules include a sealed planar fuel cell stack that has internal manifold channels for transport of fuel and air to fuel cells within the stack and transport of tail gas and spent air away from fuel cells within the stack. Each of the fuel cell stacks is mounted on a base manifold, and the base manifold has side openings in fluid communication with the stack internal manifold channels. The side openings on the base manifold are configured so that the modules can be efficiently connected together.

13 Claims, 4 Drawing Sheets

MULTIPLE STACK FUEL CELL SYSTEM WITH SHARED PLENUM

RELATIONSHIP TO GOVERNMENT CONTRACTS

This invention was made with Government support under DE-FC26-02NT41246 awarded by DOE. The Government has certain rights in this invention.

BACKGROUND OF THE INVENTION

In practical fuel cell systems, the output of a single fuel cell is typically less than one volt, so connecting multiple cells in series is required to achieve useful operating voltages. Typically, a plurality of fuel cell stages, each stage comprising a single fuel cell unit, are mechanically stacked up in a "stack" and are electrically connected in series electric flow from the anode of one cell to the cathode of an adjacent cell via intermediate stack elements known in the art as interconnects and separator plates.

A solid oxide fuel cell (SOFC) comprises a cathode layer, an electrolyte layer formed of a solid oxide bonded to the cathode layer, and an anode layer bonded to the electrolyte layer on a side opposite from the cathode layer. In use of the cell, air is passed over the surface of the cathode layer, and oxygen from the air migrates through the electrolyte layer and reacts in the anode with hydrogen being passed over the anode surface, forming water and thereby creating an electrical potential between the anode and the cathode of about 1 volt. Typically, each individual fuel cell is mounted, for handling, protection, and assembly into a stack, within a metal frame referred to in the art as a "picture frame", to form a "cell-picture frame assembly".

To facilitate formation of a prior art stack of fuel stages wherein the voltage formed is a function of the number of fuel cells in the stack, connected in series, a known intermediate process for forming an individual fuel cell stage joins together a cell-picture frame assembly with an anode interconnect and a metal separator plate to form an intermediate structure known in the art as a fuel cell cassette ("cassette"). The thin sheet metal separator plate is stamped and formed to provide, when joined to the mating cell frame and anode spacers, a flow space for the anode gas. Typically, the separator plate is formed of ferritic stainless steel for low cost.

As part of the assembly process for the cell-picture frame assembly, each cassette is sealed to the perimeter of the metal separator plate of the adjacent cassette to form a cathode air flow space and to seal the feed and exhaust passages for air and hydrogen against cross-leaking or leaking to the outside of the stack. The picture frames may also include openings therein, which provide internal manifolding after the stack has been assembled for the inter-cell flow of air and fuel to and from the intra-cell anode and cathode flow spaces.

The power output P of a fuel cell stack is the product of the voltage V and current I, $$P = IV \quad \text{(Eq. 1)}$$

The voltage is a function of the number of fuel cells connected in series in the stack, while the current is a function of the active area of the individual fuel cells. Thus, in designing a fuel cell system, to increase the power output requires an increase in either the number of fuel cells, or the individual fuel cell area, or both.

There are tradeoffs in the number of cells and the surface area of the cells to achieve a desired power level.

Adding more cells in series to increase stack voltage is relatively straightforward, but the reliability of each cell-to-cell connection becomes more critical since the overall reliability of a stack of N cells is a function of the reliability of each connection raised to the Nth power. Also, the resistive losses at the cell-to-cell junctures increase with each connection, and the proportion of system volume required for manifolding of the inlet and return gases increases. Also, in enclosed design stacks where the periphery of the stack is sealed, individual cells in the stack cannot be removed or replaced if they fail, which can result in the failure of an entire stack due to the failure of a single cell. This problem is exacerbated when the stack contains a large number of cells due to the above-described overall drop in stack reliability in stacks with large numbers of cells.

On the other hand, increasing the cell active area to increase the stack amperage by increasing the areal extent of each cell presents many challenges. The cell is a planar ceramic structure, so as the size increases the thickness must also increase to preserve the same level of mechanical strength (that is, resistance to breakage) which significantly increases the cost and size (volume) of the cell per unit area of electric generating capacity. In addition, the manufacturing defect rate is determined by the number of defects per cell, not per unit area, so as the area of a cell increases the number of defects per cell will increase, which adversely affects the overall manufacturing rejection rate in both cell manufacturing and stack manufacturing. Also, as the surface area increases at a constant length-to-width ratio (currently preferred aspect ratio of a prior art fuel cell is about 3:2), the thermal differences across the cell will increase, or the pressure drop will increase, or the gas channel height (and thus overall stack height) will increase, or some intermediate combination of all of these effects must occur. Alternatively, the width or length may be increased while maintaining the same length or width, but this departure from a prior art near-square cell shape makes firing of the ceramic cell very difficult while maintaining acceptable flatness and uniform shrinkage.

One approach to increasing power output without unduly increasing either the number cells in a stack or the surface area of the cells in the stack has been to link multiple stacks of manageable size together in a multi-stack fuel cell system. Many approaches to such system designs involve the incorporation of so-called open-cell design fuel cell stacks into a relatively large enclosure that directs fuel and air into stacks housed within the enclosure and receives tail gas and spent air from those stacks for optional further processing and ultimate discharge to the outside. Such systems are disclosed, for example, in U.S. Pat. Nos. 5,480,738 and 5,298,341, and U.S. Pat. Appl. Publ. No. 2009/0053569 A1. Such systems, however, suffer from a number of disadvantages. For example, because open-cell design stacks are open to whatever gas they are exposed to, the enclosure must often provide multiple sealed connections to the stacks so that air can be selectively directed to and spent air selectively received from cathode openings on the stack, and so that fuel can be selectively directed to and tail gas selectively received from anode openings on the stacks. Such seals must be maintained across multiple fuel cells in the stacks, which makes it difficult to account for thermal expansion while maintaining a gas-tight seal. Additionally, since the cells in a stack are connected in electrical series, they are at different voltages, so the seal must be electrically insulating, which can make it even more difficult to establish and maintain a gas-tight seal through multiple thermal cycles. Some design approaches reduce the requirement for sealing surfaces across multiple cells by using alternative flow patterns within the stack. For example, the above-cited U.S. Pat. No. 5,480,738 provides for vertical fuel flow upwards through the stack while having horizontal air flow across the cell cathode surfaces. This design, however, produces a cross-flow arrangement of fuel and air flows across the fuel cells, which causes high thermal gradients and therefore high stress on the cells. In addition, a vertical cell orientation is less resistant to external forces such as gravity and vibration coming from the surrounding environment, which may be better absorbed by the cell and supporting structures in a horizontal arrangement. Also, external manifolding arrangements are difficult to seal due to irregular surfaces on the sides of the stacks inherent in this layered construction.

The above-described disadvantages with open-cell stack designs can be avoided by an enclosed cell stack design with internal manifold channels for fuel and air flow as described, for example, in U.S. Pat. No. 7,306,872. Heretofore, however, there has not been a way to effectively connect multiple enclosed cell design stacks without the use of complex external manifolds.

What is needed in the art is a means to increase the power output of a fuel cell system while mitigating the occurrence of the above-identified problems.

SUMMARY OF THE INVENTION

The present invention provides a multi-stack fuel cell system where multiple fuel cell stacks can be efficiently connected together. According to the present invention, there is provided a fuel cell system comprising a plurality of fuel cell modules that comprise a sealed planar fuel cell stack, the stack including internal manifold channels for transport of fuel and air to fuel cells within the stack and transport of tail gas and spent air away from fuel cells within the stack. Each of the fuel cell stacks is mounted on a base manifold, and the base manifold comprises a top member and a bottom member with at least four side members disposed between.

The base manifold includes first and second base manifold side members that each include:

(1) at least one side inlet opening that is in fluid communication, through at least one opening in the base manifold top member, with either stack internal channels for delivering air to the fuel cells within the stack or stack internal channels for delivering fuel to the fuel cells within the stack;

(2) at least one side outlet opening that is in fluid communication, through at least one opening in the base manifold top member, with either stack internal channels for exhausting spent air from the fuel cells within the stack or with stack internal channels for exhausting tail gas from the fuel cells within the stack;

A third manifold side member includes at least one side inlet opening that is in fluid communication, through at least one opening in the base manifold top member, with whichever of the stack internal channels for delivering air to the fuel cells within the stack or the stack internal channels for delivering fuel to the fuel cells within the stack is not in fluid communication with the at least one side inlet opening on the first or second side member. A fourth manifold side member includes at least one side outlet opening that is in fluid communication, through at least one opening in the base manifold top member, with whichever of the stack internal channels for exhausting spent air from the fuel cells within the stack or with the stack internal channels for exhausting tail gas from the fuel cells within the stack is not in fluid communication with the at least one side outlet opening on the first or second side member.

The base manifold side inlet openings on the first or second manifold side members of the fuel cell modules in the system are in fluid communication with a fuel or air source, based on whether they are in fluid communication with stack internal fuel channels or stack internal air channels, respectively. Similarly, the base manifold's side outlet opening is in fluid communication with a top spent air or tail gas inlet so that the base manifold can exhaust either spent air or tail gas from the fuel cell stack to the atmosphere or to an air or tail gas exhaust component.

The system also includes an air or fuel supply plenum that supplies air or fuel (whichever is not supplied through the side inlet opening on the first or second manifold side member) to the inlet opening on the third manifold side member.

The above-described modules of fuel cell stacks mounted on top of base manifolds may be tied together in an exemplary embodiment by the provision of at least two fuel cell modules that are juxtaposed with one another such that a side air opening, side spent air opening, side fuel opening, and side tail gas opening on the base manifold of one of the juxtaposed fuel cell modules is respectively juxtaposed with and connected in fluid communication with a side air opening, side spent air opening, side fuel opening, and side tail gas opening on the base manifold of the other juxtaposed fuel cell module. Connecting at least one side air opening on one of the connected manifolds in fluid communication with an air source, at least one side spent air opening on one of the connected manifolds in fluid communication with the atmosphere or an air exhaust handler, at least one side fuel opening on one of the connected manifolds in fluid communication with a fuel source, or at least one side tail gas opening on one of the connected manifolds in fluid communication with the atmosphere or a tail gas exhaust handler would therefore place the other connected openings in fluid communication with such air source, air exhaust handler, fuel source, or tail gas exhaust handler.

The invention allows for a number of fuel cell stack modules to be connected together to provide a fuel cell system capable of producing power outputs that otherwise would have required large surface area cells or large numbers of cells. Multiple modestly-sized stacks (e.g., 5 kW to 30 kW) can be used so that higher power levels can be achieved using stacks that have been produced for other markets like the APU market, providing potentially significant economies of scale by avoiding the need to design different stacks for higher power applications. Also, any number of fuel cell stack modules can be easily connected together, so the system is highly flexible.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, Referring now to the Figures, the invention will be described with reference to specific embodiments, without limiting same. Where practical, reference numbers for like components are commonly used among multiple figures.

Figure 1:
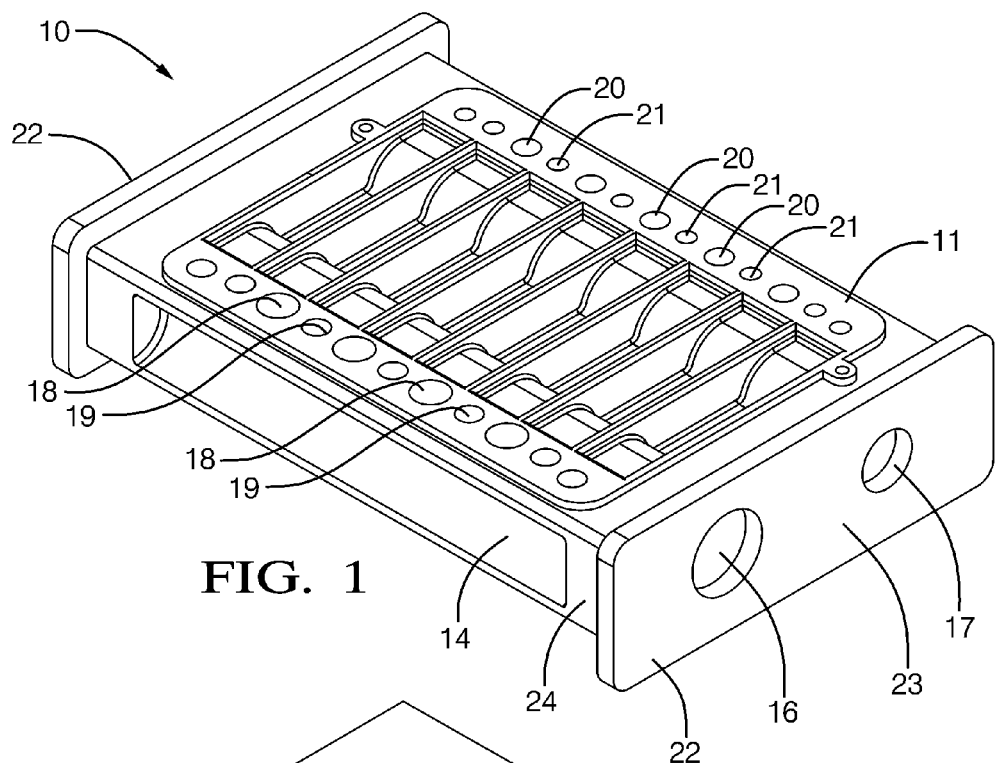
FIG. 1 shows a perspective view of a base manifold that can be used to practice the invention.
Figure 2:
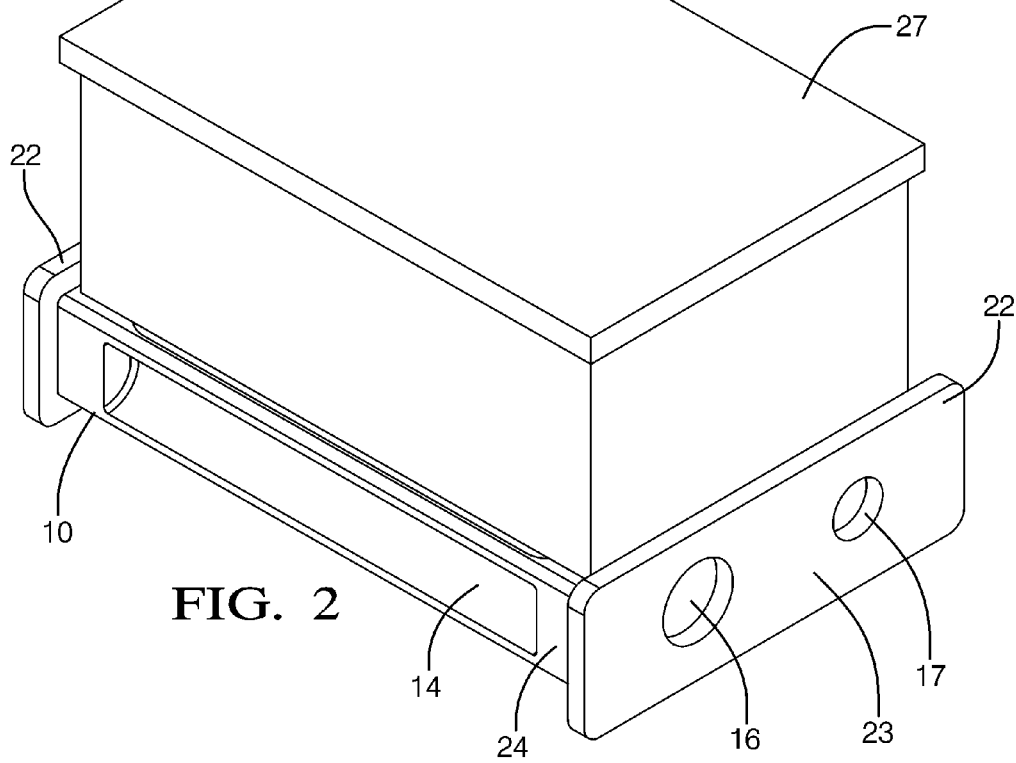
FIG. 2 shows a perspective view of the base manifold of FIG. 1 with a fuel cell stack mounted thereon to form a fuel cell module that can be used to practice the invention.

Turning now to FIGS. 1 and 2, an exemplary embodiment of a base manifold that can be used to practice the invention is shown in perspective view. In FIG. 1, a base manifold 10 with top member 11, first side member 23, and third side member 24 is shown. A second base manifold side member opposite the first side member 23, and a fourth base manifold side member opposite the third side member 24 are not shown. Each of the openings 16 and 17 on first base manifold side member 23 is in fluid communication through channels in the base manifold 10 with openings 16 and 17 symmetrically disposed on the second side member (not shown) on the opposite side of the manifold from side member 23. Inlet openings 16 receive an air feed from an air source such as an air pump (not shown) or a fuel feed from a fuel source such as a reformer or natural gas feed (not shown), and are in fluid communication through internal channels (not shown) with top member openings 19, which feed air or fuel to internal channels in the fuel cell stack for distribution to the fuel cells. Outlet openings 17 receive spent air or tail gas through internal channels (not shown) from top member openings 21, which in turn receive spent air or tail gas from the fuel cells through internal channels in the fuel cell stack. Outlet openings 17 discharge the spent air or fuel tail gas to the atmosphere or a separate exhaust handler (e.g., a tail gas burner). Inlet opening 14 is disposed on third base manifold side member 24 to receive an air or fuel feed (whichever is not provided to inlet opening 16) from a plenum to be disposed adjacent to base manifold side member 24. Inlet opening 14 receives air or fuel feed through the plenum from an air or fuel source such as an air pump or reformer (not shown), and is in fluid communication through internal channels (not shown) with top member openings 18, which feed air or fuel to internal channels in the fuel cell stack for distribution to the fuel cells. An outlet opening similarly configured to inlet opening 14 is disposed on fourth base manifold side member (not shown) on the opposite side of the manifold from third base manifold side member 24. The outlet opening on the fourth base manifold side member exhausts either directly to the atmosphere or, in one exemplary embodiment, to a gas collection plenum for transport to a vent or other exhaust handler such as a tail gas burner. The outlet opening on the fourth base manifold side member receives spent air or tail gas through internal channels (not shown) from top member openings 20, which in turn receive spent air or tail gas from the fuel cells through internal channels in the fuel cell stack. First base manifold side member 23 and the second side member on the opposite side of the manifold (not shown) have flange extensions 22 thereon for connecting to base manifolds of adjacent juxtaposed fuel cell modules or to an external manifold, for example to connect the respective air or fuel source or exhaust handlers.

As described above, one of the inlets 14 and 16 will be an air inlet and the other will be a fuel inlet, and one of the outlet 17 and the outlet on the fourth base manifold side member (not shown) will be a spent air outlet and the other will be a tail gas outlet. For ease of illustration, the remainder of the Figures will refer to an exemplary embodiment where inlet 14 receives air from an air supply plenum, the outlet on the fourth base manifold side member (not shown) is a spent air outlet, the inlet 16 is a fuel inlet, and the outlet 17 is a tail gas outlet, and it is understood that the air/fuel roles could be reversed. In one or more exemplary embodiments, any or all of the base manifold first, second, third, and/or fourth side members are adapted to be sealingly connected to respective inlet or outlet pipes, manifolds, plenums, or blank sealing plates. In a further exemplary embodiment, any or all of the base manifold side members have smooth planar surfaces adapted to have the respective inlet or outlet pipes, plenums, or blank sealing plates sealingly mounted thereto. Gaskets, o-rings, and the like may be used to enhance the seals, and the base manifold may also be equipped with fixtures for mounting hardware, as is known in the art. Sealing and mounting the plenum to the base manifold provides substantial advantages over configurations where the plenum is sealed to the stacks themselves. Sealing a plenum to the stack can suffer from poor seal against the irregular stack surfaces as well as running the risk of electrical shorts, which are readily avoided by mounting to a base manifold that has been electrically isolated from the stack.

Turning now to FIG. 2, a fuel cell stack 27 is shown mounted on the base manifold top member 11. The fuel cell stack has internal channels (not shown) for delivering air received from manifold openings 18 and fuel received from manifold openings 19 to the cells in the stack, and for delivering spent air from fuel cells in the stack to manifold openings 20 and tail gas to manifold openings 21. The fuel cell stack is mounted on the base manifold such that the stack's internal channels are in fluid communication with the above-referenced openings on the manifold top member. In an exemplary embodiment, the fuel cell stack is electrically isolated from the base manifold.

Figure 3:
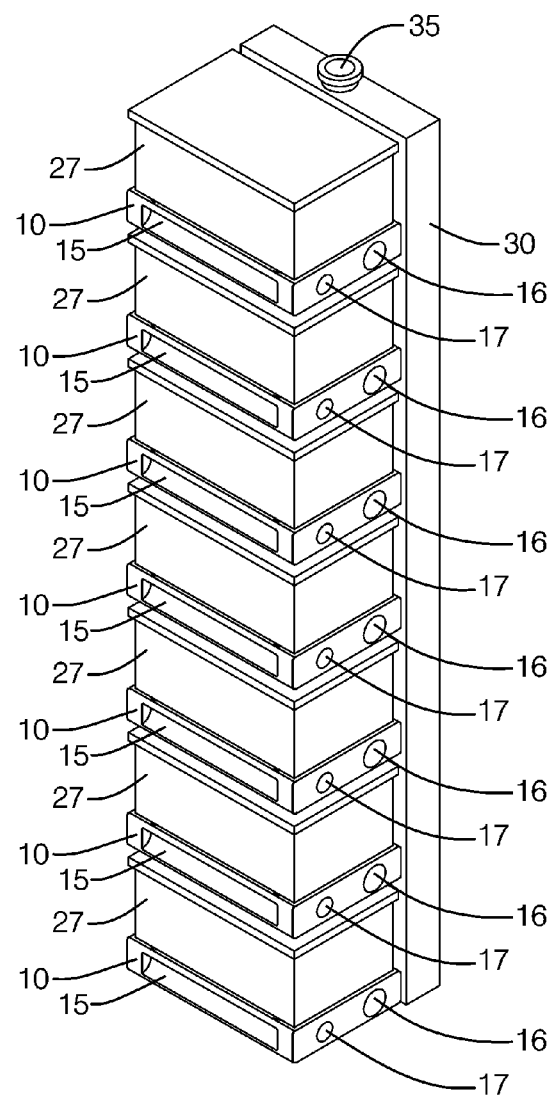
FIG. 3 shows a perspective view of a fuel cell system of five of the fuel cell modules of FIG. 2 arranged in a vertical configuration.

Turning now to FIG. 3, a fuel cell system is shown with five of the modules from FIG. 2 disposed in a vertical linear array configuration. If each of the fuel cell stacks had a 5 kW power capacity and were electrically connected in parallel or series or a combination thereof, this system would provide 25 kW of power. Air supply plenum 30 having air inlet 35 is disposed along one side of the array of modules adjacent to their third base manifold side members in fluid communication and sealingly connected with the air inlet openings 14 (not shown). The other openings are shown as open for purposes of illustration, but in operation would of course be connected to external components, such as an external manifold connected to a fuel source (e.g., a hydrocarbon reformer) for the fuel openings 16, a spent air collection plenum connected to an air exhaust handler (e.g., a vent) for the spent air openings 15 on the fourth base manifold side members of the modules, and an external manifold connected to a tail gas exhaust handler (e.g., a burner) for tail gas openings 17. The openings (not shown in FIG. 3) on the modules' first base manifold side members may be connected to similar or the same external components as the shown openings 16 and 17 on the second base manifold side member, or they may be sealed with a blank flange or flanges mounted on the left-most flange 22, depending on the gas flow requirements of the system.

Figure 4:
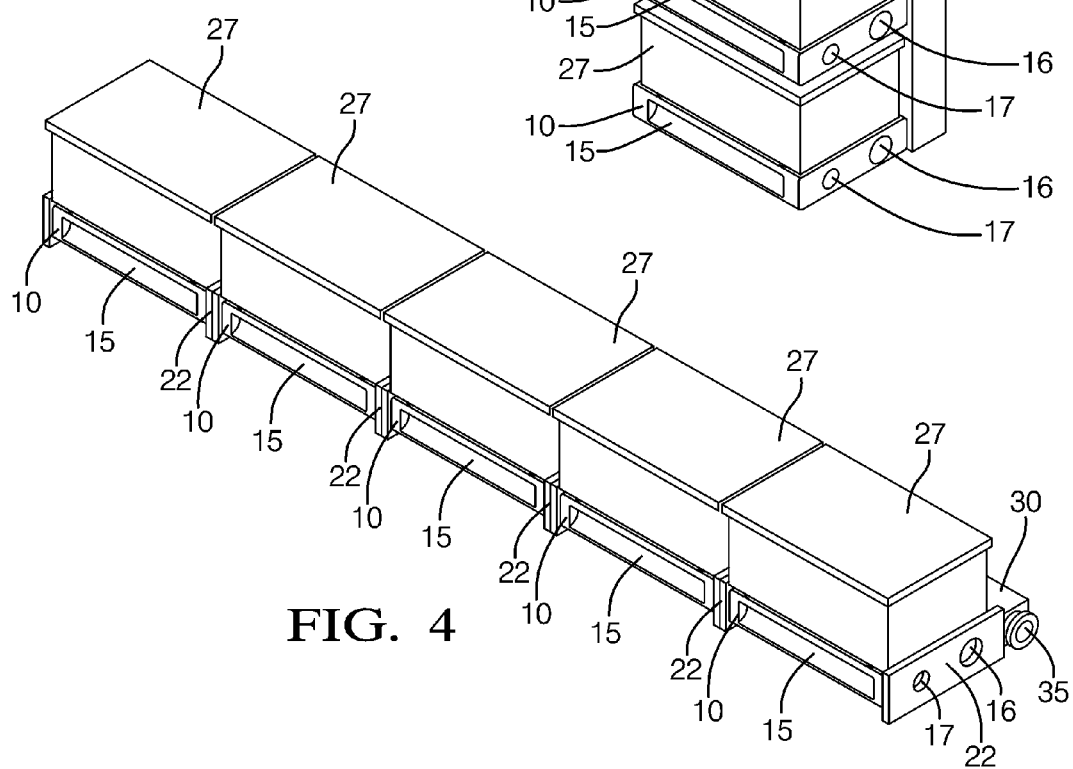
FIG. 4 shows a perspective view of a fuel cell system of five of the fuel cell modules of FIG. 2 arranged in a horizontal linear configuration.

Turning now to FIG. 4, a fuel cell system is shown with five of the modules from FIG. 2 disposed in a horizontal linear array configuration. If each of the fuel cell stacks had a 5 kW power capacity and were electrically connected in parallel or series or a combination thereof, this system would provide 25 kW of power. Air supply plenum 30 having air inlet 35 is disposed along one side of the array of modules adjacent to their third base manifold side members in fluid communication and sealingly connected with the air inlet openings 14 (not shown). Each module is shown connected to adjacent module(s) with a suitable connector (e.g., nut and bolt) at the flanges 22 so that the openings 16 and 17 on each module are in fluid communication with the respective openings 16 and 17 on adjacent module(s). In an exemplary embodiment as shown in FIG. 4, the adjacent modules are directly connected to one another (a "direct" connection is defined herein for this purpose to include embodiments where a sealant or gasket is disposed between the adjacent flanges 22). In other exemplary embodiments, however, it is contemplated that indirect connections may be utilized where an inter-module connector is used, such as a metal tube with flanges on each end for mating with the module flanges 22. The openings 16 and 17 on the second base manifold side member on the right end of the array and the openings 15 are shown as open for purposes of illustration, but in operation would of course be connected to external components, such as a fuel source (e.g., a hydrocarbon reformer) for fuel opening 16, a spent air collection plenum connected to an air exhaust handler (e.g., a vent) for the spent air openings 15, and a tail gas exhaust handler (e.g., a burner) for tail gas opening 17. The openings (not shown in FIG. 4) on the first base manifold side member on the left end module may be connected to similar or the same external components, or they may be sealed with a blank flange mounted on the left-most flange 22, depending on the gas flow requirements of the system. Alternatively, since only one out of the two available end openings for openings 16 and 17 needs to be functional, any combination of these openings may be selected to be functional. For example, the right end module may have the fuel opening 16 connected to a fuel source and tail gas outlet 17 closed off while the left end module may has the tail gas outlet connected to an exhaust handler and the fuel inlet blocked off.

Figure 5:
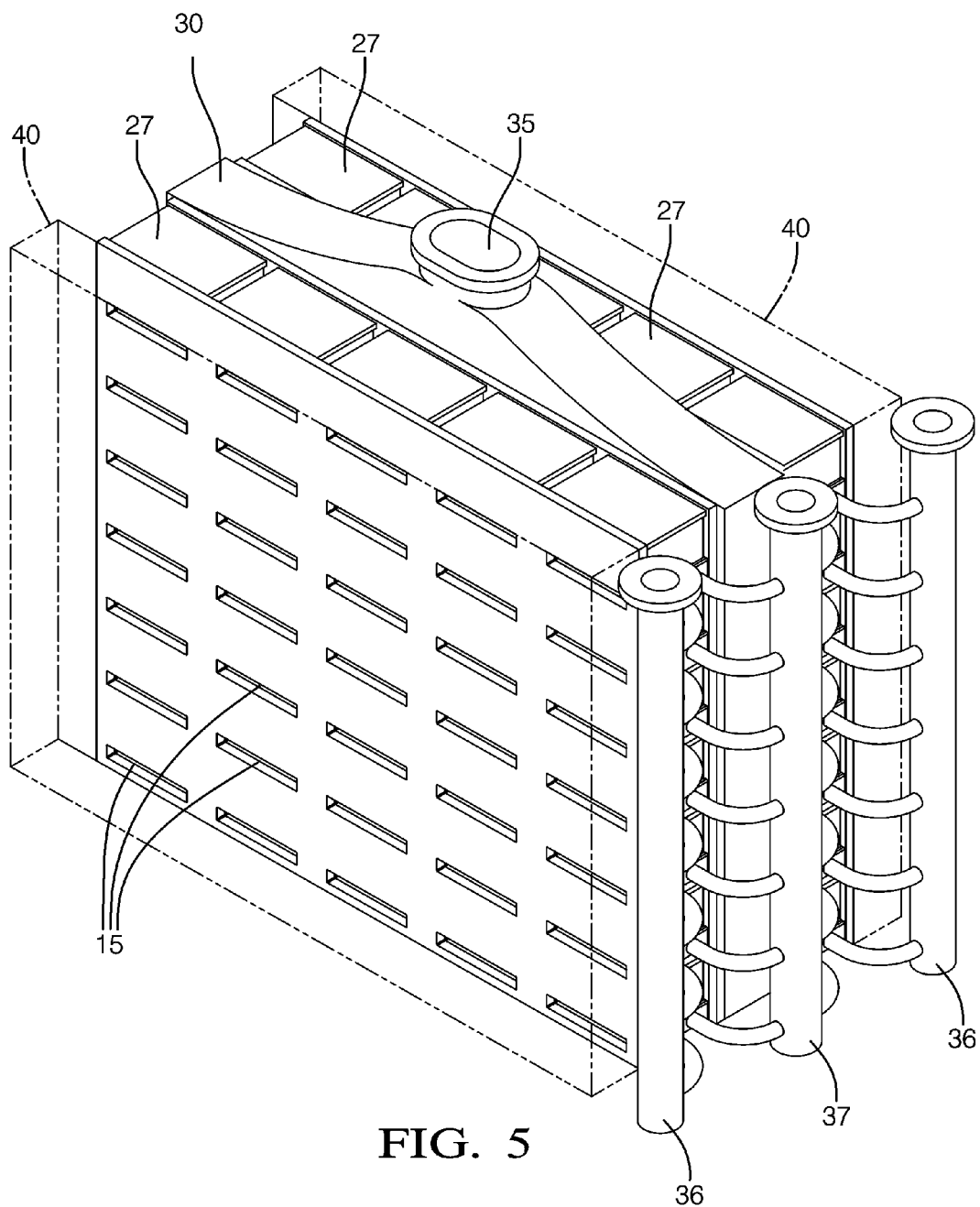
FIG. 5 shows a perspective view of fuel cell system of two 4×7 module arrays disposed around a plenum.

Turning now to FIG. 5, there is shown a system assembled from four-module horizontal linear arrays similar to the five-module array of FIG. 3. Seven of these four-module arrays are stacked vertically to form a 4×7 two-dimensional array of fuel cell stack modules, and two of these 4×7 two-dimensional arrays are disposed on opposite sides of and sealingly connected with a central air supply plenum 30 having air inlet 35 that receives air from an air source such as an air pump. External fuel supply manifold 37 supplies fuel from a fuel source such as a hydrocarbon reformer to the fuel inlet openings 16 and external tail gas manifold 36 receives tail gas exhaust from the tail gas outlets 17 for transport to a tail gas handler such as a tail gas burner. Spent air collection plenums 40 receive spent air from the spent air outlets 15 for transport to a spent air handler such as a vent. The fuel openings 16 and tail gas openings 17 on the left end modules are closed off.

Figure 6:
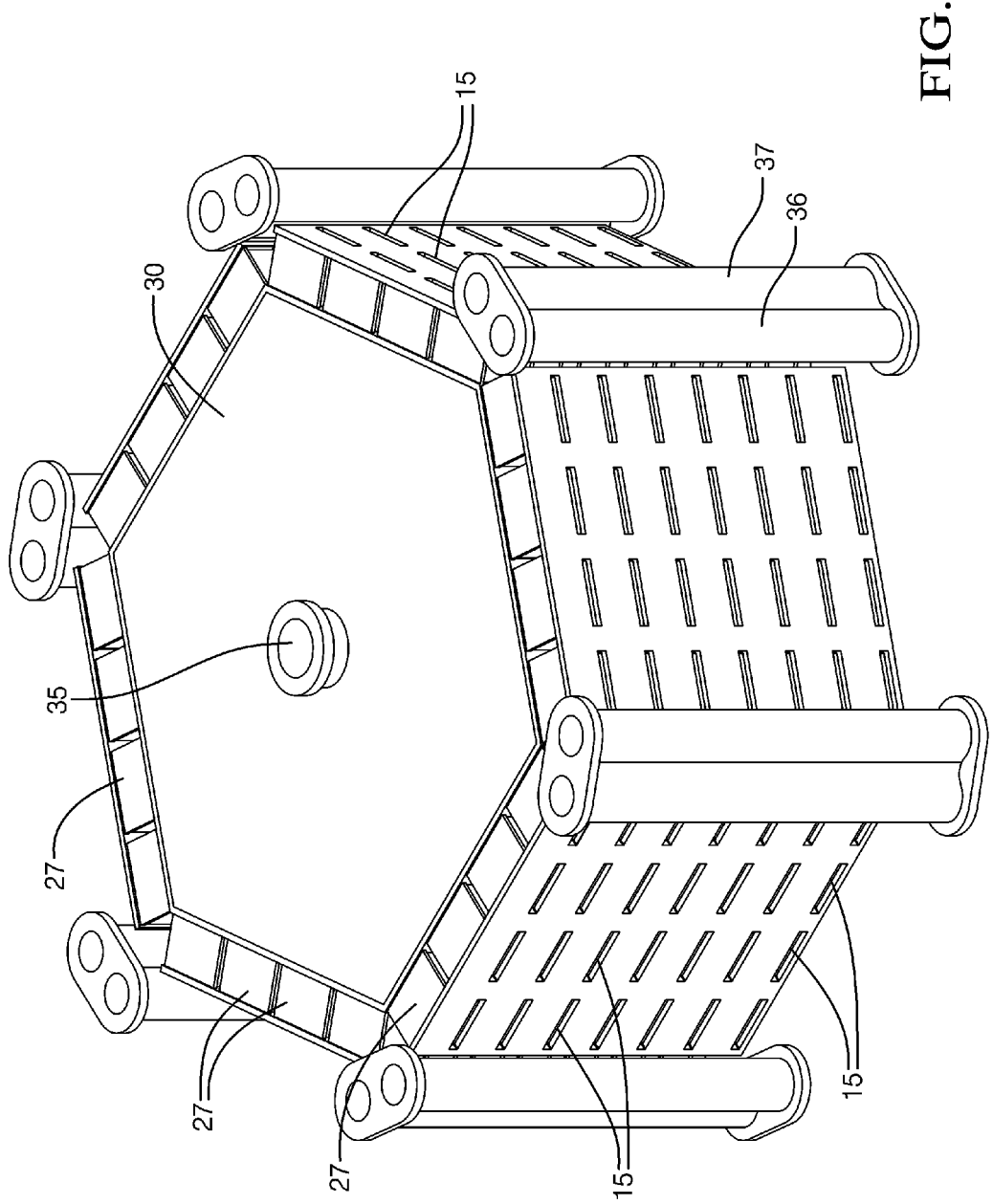
FIG. 6 shows a perspective view of fuel cell system of six 4×7 module arrays disposed around a central plenum.

Turning now to FIG. 6, there is shown an alternative embodiment of a system assembled from the 4×7 two-dimensional arrays of fuel stack modules used in FIG. 5. In FIG. 6 six of these 4×7 two-dimensional arrays are disposed around a central air supply plenum 30 having air inlet 35 that receives air from an air source such as an air pump. External fuel supply manifold 37 supplies fuel from a fuel source such as a hydrocarbon reformer to the fuel inlet openings 16 and external tail gas manifold 36 receives tail gas exhaust from the tail gas outlets 17 for transport to a tail gas handler such as a tail gas burner. Unlike FIG. 5, the spent air outlets 15 exhaust spent air directly to the atmosphere without the need for a spent air collection plenum. The fuel openings 16 and tail gas openings 17 on one end of each of the arrays are closed off so that manifolds 36 and 37 only need to be placed between every other space between the arrays.

The modular fuel cell system disclosed herein can provide for economies of scale by using small stacks mass-produced for the APU market to be used in place of large power output stack by mounting the stacks onto a modular base manifold. The power leads for each stack would pass out of the often hostile stack environment into an external environment where they can be connected in combinations of series and/or parallel as desired. Additionally, each stack can be independently connected to power electronic controls so that the performance of each stack can be individually optimized, and one stack operating below performance standards would have little effect on the complete system, and could even be switched off if required, and then later replaced with a new stack if desired.

The system disclosed herein can be used with any type of fuel cell stack, including SOFC, PEM, molten carbonate, or phosphoric acid. In one exemplary embodiment, the fuel cell stack is a solid oxide fuel cell (SOFC) stack. In another exemplary embodiment, the SOFC stack is made up of a plurality of repeating fuel cell cassettes that comprise a frame disposed around at least one fuel cell, such as disclosed in the above-referenced U.S. Pat. No. 7,306,872.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A fuel cell system comprising a plurality of fuel cell modules that comprise a sealed planar fuel cell stack, the stack including internal manifold channels for delivery of fuel and air to fuel cells within the stack and removal of tail gas and spent air away from fuel cells within the stack, each of said fuel cell stacks mounted on a base manifold, said base manifold comprising a top member and a bottom member with at least four side members disposed therebetween, wherein
  (a) the base manifold includes first and second base manifold side members that each include:
    (1) at least one side inlet opening that is in fluid communication, through at least one opening in the base manifold top member, with either stack internal channels for delivering air to the fuel cells within the stack or stack internal channels for delivering fuel to the fuel cells within the stack;
    (2) at least one side outlet opening that is in fluid communication, through at least one opening in the base manifold top member, with either stack internal channels for exhausting spent air from the fuel cells within the stack or with stack internal channels for exhausting tail gas from the fuel cells within the stack;

(b) the base manifold includes a third manifold side member that includes at least one side inlet opening that is in fluid communication, through at least one opening in the base manifold top member, with whichever of the stack internal channels for delivering air to the fuel cells within the stack or the stack internal channels for delivering fuel to the fuel cells within the stack is not in fluid communication with the at least one side inlet opening (a)(1); and (c) the base manifold includes a fourth manifold side member that includes at least one side outlet opening that is in fluid communication, through at least one opening in the base manifold top member, with whichever of the stack internal channels for exhausting spent air from the fuel cells within the stack or with the stack internal channels for exhausting tail gas from the fuel cells within the stack is not in fluid communication with the at least one side outlet opening (a)(2); and further wherein the fuel cell modules of the system are disposed adjacent to either a fuel supply plenum or an air supply plenum such that each module includes a side inlet opening on the third manifold side member in fluid communication with said plenum; and the fuel cell modules of the system each includes at least one side inlet opening on the first or second manifold side member in fluid communication with a fuel source and at least one side outlet opening on the first or second manifold side member in fluid communication with the atmosphere or a tail gas exhaust if the plenum is an air supply plenum, or the fuel cell modules of the system each includes at least one side inlet opening on the first or second manifold side member in fluid communication with an air source and at least one side outlet opening on the first or second manifold side member in fluid communication with the atmosphere or an air exhaust if the plenum is a fuel supply plenum.

2. A fuel cell system according to claim 1 that includes a row of at least two of said fuel cell modules arranged in a linear configuration with side inlet and outlet openings on first or second manifold side members being respectively juxtaposed with and connected in fluid communication with side inlet and outlet openings on first or second manifold side members of adjacent fuel cell modules.

3. A fuel cell system according to claim 2 comprising a plurality of said rows.

4. A fuel cell system according to claim 3 wherein said plurality of rows are stacked vertically to form a two-dimensional array of fuel cell modules.

5. A fuel cell system according to claim 4 comprising a plurality of said arrays.

6. A fuel cell system according to claim 4, further comprising at least one external manifold that connects a plurality of side inlet openings along one end of said two-dimensional array in fluid communication with an air or fuel source and connects a plurality of side outlet openings along one end of said two-dimensional array in fluid communication with the atmosphere or an air or tail gas exhaust.

7. A fuel cell system according to claim 6 comprising a plurality of said arrays.

8. A fuel cell system according to claim 7 wherein the plenum is an air supply plenum and the at least one external manifold connects a plurality of side inlet openings along one end of said two-dimensional array in fluid communication with a fuel source and connects a plurality of side outlet openings along one end of said two-dimensional array in fluid communication with the atmosphere or a tail gas exhaust.

9. A fuel cell system according to claim 1 wherein the plenum is an air supply plenum.

10. A fuel cell system according to claim 2 wherein the juxtaposed base manifold side members of the juxtaposed fuel cell modules are directly connected to one another.

11. A fuel cell system according to claim 1 wherein the fuel cell stacks comprise solid oxide fuel cells.

12. A fuel cell system according to claim 9 wherein the power capacity of the fuel cell stacks is from 5 kW to 30 kW per stack.

13. A fuel cell system according to claim 9 wherein the fuel cell stacks comprise a plurality of repeating fuel cell cassettes that comprise a frame disposed around at least one fuel cell.

* * * * *